United States Patent [19]
Allison et al.

[11] Patent Number: 4,649,609
[45] Date of Patent: Mar. 17, 1987

[54] APPARATUS AND PROCESS FOR PROVIDING AN ALTERNATE COOLANT PATH IN THE CORE OF A NUCLEAR REACTOR

[75] Inventors: Ricardo A. Allison, Monroeville; John B. Gunter, Pittsburgh; Clifford J. Winkler, Plum Borough; Diane E. Falk, Penn Hills; Ray F. Chuang, Pittsburgh, all of Pa.

[73] Assignee: Westinghouse Electric Corp., Pittsburgh, Pa.

[21] Appl. No.: 567,103

[22] Filed: Dec. 30, 1983

[51] Int. Cl.$^4$ .................. B23B 39/14; B23B 35/00; G21C 15/02; G21C 17/00
[52] U.S. Cl. .................. 29/26 A; 376/249; 376/400; 408/1 R; 408/13; 409/137
[58] Field of Search .............. 376/249, 260, 399, 400; 408/1 R, 103, 203.5, 204, 703, 79, 80, 13; 29/26 A, DIG. 52, DIG. 61, DIG. 78, DIG. 84; 409/137; 33/125 W, DIG. 5

[56] References Cited

U.S. PATENT DOCUMENTS

| | | | |
|---|---|---|---|
| 566,082 | 8/1896 | Lawrence et al. | 29/DIG. 52 X |
| 2,660,054 | 11/1953 | Pringle, Jr. | 33/125 W X |
| 4,011,792 | 3/1977 | Davis | 408/61 X |
| 4,158,605 | 6/1979 | Cooper | 376/400 |
| 4,199,857 | 4/1980 | Meuschke | 376/260 X |
| 4,393,899 | 7/1983 | Tsuji et al. | 376/260 X |
| 4,421,715 | 12/1983 | Gunter et al. | 376/249 X |
| 4,425,061 | 1/1984 | Kindl et al. | 408/13 X |
| 4,425,298 | 1/1984 | Shields . | |
| 4,591,068 | 5/1968 | Tolino et al. . | |

Primary Examiner—Gil Weidenfeld
Assistant Examiner—Steven C. Bishop
Attorney, Agent, or Firm—L. A. DePaul

[57] ABSTRACT

Both an apparatus and process for providing a coolant flow path in the top former plate of the core of a nuclear reactor are disclosed. The apparatus of the invention generally comprises an elongated tool support member having a tool mounting means for detachably mounting various tools in the vicinity of the top former plate, and a clamp assembly for securing and positioning the tool mounting means over the plate. The apparatus also includes an ultrasonic transducer (or probe) for measuring the thickness of the plate, a rotabroach device having a feed and drive assembly for driving a pilot drill bit and a rotabroach bit toward the top former plate, and a piercing tool for removing the slug formed by the rotabroach bit. In the process of the invention, an alternate coolant flow path is provided in the top former plate by boring a plurality of holes therethrough. In the boring process, the ultrasonic transducer is first detachably mounted onto the tool mounting means in order to measure the thickness of the plate. Next, the ultrasonic transducer is replaced on the tool mounting means by the rotabroach device and a pilot hole is drilled through the plate. The pilot hole is then broached by a rotabroach bit which penetrates down to the last 0.030 in. of the plate. Simultaneously, metal chips and slivers are removed with a chip breaking and collecting system. Finally, the feed and drive assembly are replaced by a piercing tool which removed the slug of metal in the broached hole in "can-opener" fashion to minimize the amount of metal chips generated by the cutting.

40 Claims, 15 Drawing Figures

FIG. 1

PRIOR ART

APPARATUS AND PROCESS FOR PROVIDING AN ALTERNATE COOLANT PATH IN THE CORE OF A NUCLEAR REACTOR

BACKGROUND OF THE INVENTION

This invention relates to both an apparatus and a process for providing an alternate coolant path in the core of a nuclear reactor by boring a plurality of holes through the top former plate of the core barrel.

DESCRIPTION OF THE RELATED ART

In many nuclear reactors, the path of the coolant flowing through the core has created a pressure differential which has caused high pressure streams of coolant to squirt through the gaps between the baffle plates in the core barrel. These streams of coolant will sometimes impinge on the relatively delicate fuel rods contained in the fuel rod assemblies, and cause them to rattle against their support grids. Such rattling may damage and ultimately break the delicate fuel rods, thereby contaminating the water within the core barrel with particles of radioactive uranium dioxide.

One solution to this problem of coolant "jetting" is disclosed in copending U.S. patent application Ser. No. 252,116, now U.S. Pat. No. 4,425,298, filed Apr. 8, 1981 by E. P. Shields, entitled "Baffle Maintenance Apparatus", and assigned to Westinghouse Electric Corporation. In this application, an apparatus for reducing the size of the gaps between the baffle plates (which are normally only bolted together) is disclosed which reduces the amount of coolant which jets therethrough.

Another solution to the problem is disclosed in U.S. patent application Ser. No. 466,464, now U.S. Pat. No. 4,591,068, filed Feb. 15, 1983 by Ralph W. Tolino et al, entitled "Core Barrel Plug", and likewise assigned to Westinghouse Electric Corporation. This patent application describes both an apparatus and a method for altering the flow of coolant through the core barrel in which the lateral inlet ports of the core barrel are plugged by means of a special plugging tool. After such plugging is achieved, the coolant, instead of flowing down between the inner walls of the core barrel and the outer walls of the baffle plates, is forced to flow upwardly in this space, in the same direction and about the same speed as the streams of coolant entering the bottom of the core barrel. However, in order to implement this alteration of the coolant flow path, it is necessary to bore a plurality of holes through the top former plate which overlies the gap between the outside walls of the baffle plates and the inside walls of the core barrel. If these holes are not bored, the upflowing stream of coolant flowing within this cap will encounter a great deal of resistance in flowing over the outside of the baffle plates and out of the core barrel. The end result in such a case would be that the upstream coolant flow would not effectively cool the outside walls of the baffle plates, as it must for proper operation of the reactor.

While it is possible to bore the necessary holes in the 2" to 3" thick top former plate with conventional machine tools, the applicants have found that the use of conventional tools is difficult, expensive and laborious. Additionally, the use of conventional machine tools creates metal chips and slivers which fall into the coolant streams in the reactor and scour the inside of the coolant pumps, thereby damaging them. Clearly, there is a need for an apparatus and process for conveniently and inexpensively boring a plurality of holes in the top former plate of a nuclear reactor in order to eliminate or reduce the resistance this plate applies to the upflowing current created when the lateral ports of the core barrel are plugged. Ideally, such an apparatus and process should include some means for removing the troublesome metal chips and slivers formed from a boring operation.

SUMMARY OF THE INVENTION

In its broadest sense, the apparatus of the invention is a tooling system for supporting and positioning a tool over a plate in the core of a nuclear reactor. The tooling system includes an elongated tool support assembly having a tool mounting means for detachably mounting at least one tool, and a clamp assembly for securing and positioning the tool support means in the vicinity of the plate. A positioning means, which may be a crane, positions the tool support assembly in a variety of desired positions over the plate.

The apparatus of the invention is particularly adapted for performing a machine operation on the top former plate which overlies the space between the baffle plates and the inner walls of the core barrel of a nuclear core assembly. The clamp assembly of the tool support assembly may include a brace for positioning and aligning the tool support with a corner formed by the baffle plates which abut and extend above the top former plate. The clamp assembly may also include at least two biasing means, such as hydraulically-operated screw clamps, for biasing the brace toward the corner formed by the abutting baffle plates, thereby seating the brace in the corner and positioning the tool support member.

The elongated tool support assembly may also include a base with at least one pin at its bottom which is seatable within a port in the lower core plate of the core barrel in order to position and secure the tool support assembly. Additionally, the top of the tool support assembly may include a lifting bail engageable with the hook of the aforementioned crane.

The apparatus of the invention may further include a plate thickness detecting means, such as an ultrasonic probe, as well as a rotabroach device having a feed and drive assembly for driving a pilot bit and a broaching tool into the top former plate. Both the ultrasonic probe and the feed drive assembly may be detachably mountable on the tool mounting means of the tool support assembly. The feed and drive assembly may include a chip breaking and collecting means for breaking and collecting chips resulting from the drilling and broaching of the top former plate so that they do not have an opportunity to fall into the water in the reactor and foul the coolant pumps. The feed and drive assembly may further include a monitoring means, such as a linear variable differential transformer, for monitoring the distance between the pilot bit and the broaching tool in the bottom surface of the top former plate to insure that neither of these tools completely penetrates the plate during the drilling or broaching process. This last feature insures that the chip breaking and collecting means will have an opportunity to clear the hole of metal chips before the hole is completely broached. Finally, the apparatus of the invention may include a piercing tool for cutting the slug out of the plate in "can-opener" fashion to minimize the formation of metal chips and slivers.

The process of the invention generally includes the step of diverting the direction of the coolant flow in the core of a nuclear reactor through the top former plate by boring a plurality of holes through the plate. In the hole boring process, the tool support assembly is placed in the desired position over the top former plate by the crane, and the clamp assembly is engaged with a corner formed by a pair of abutting baffle plates in order to position the tool mounting means of the tool support assembly over a specific portion of the top former plate. The plate thickness detector is then detachably mounted on the tool mounting means, and the thickness of the plate is measured. Next, the plate thickness detector is removed and replaced by the feed and drive assembly of the invention. A pilot hole is bored into (but not completely through) the plate while the chip breaking and collecting system breaks and collects the chips resulting therefrom. Following this step, the pilot hole is then broached by the broaching bit until the bit is approximately 0.0030 inch from the bottom surface of the top former plate. The annulus created by the broaching tool is then cleaned by the chip breaking and collecting system. Finally, the slug of the plate remaining in the broached hole is removed with a piercing tool, and the resulting broached hole is deburred.

DETAILED DESCRIPTION OF THE PREFERRED EMBODIMENT

General Overview of the Purpose, Apparatus and Process of the Invention

Figure 1:
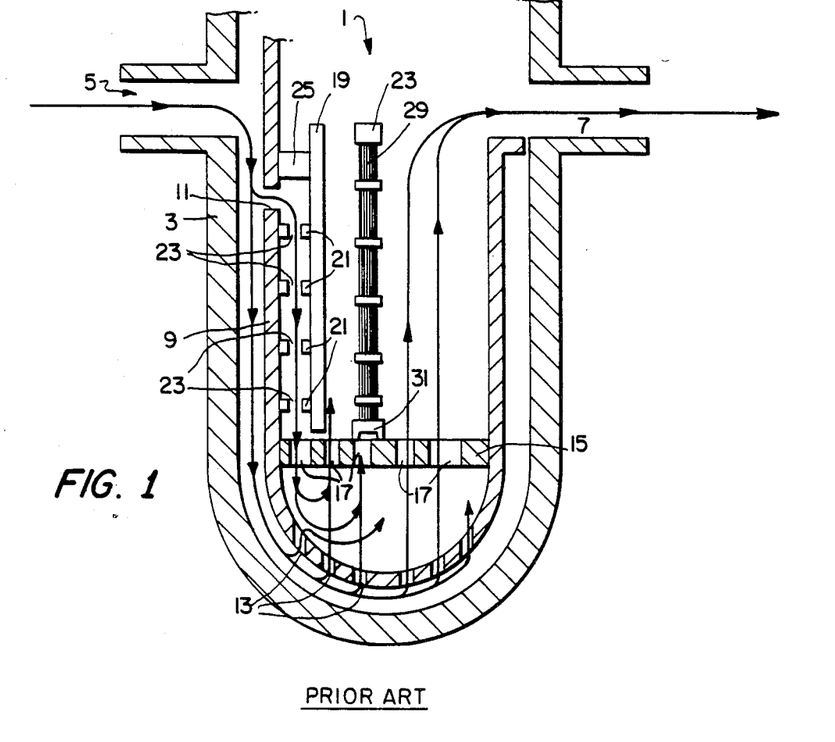
FIG. 1 is a schematic, cross-sectional view of the core of a nuclear reactor, illustrating the flow path of the coolant through a conventional core barrel.
Figure 2:
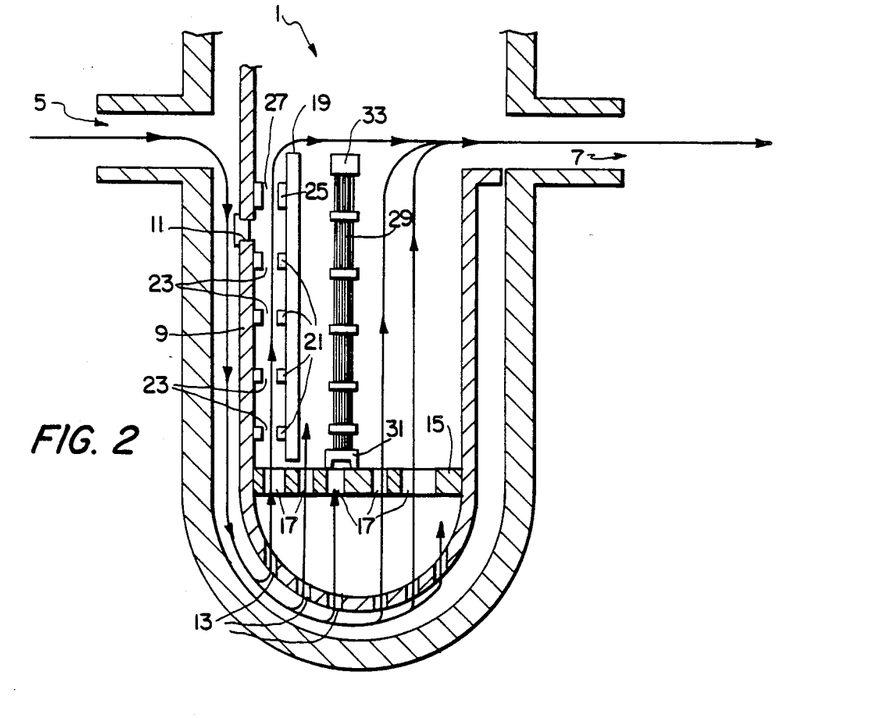
FIG. 2 is a schematic, cross-sectional view of the core of a nuclear reactor in which the flow path of the coolant has been modified to include a flow path to the top former plate, in accordance with the process of the invention.
Figures 3, 11, 12:
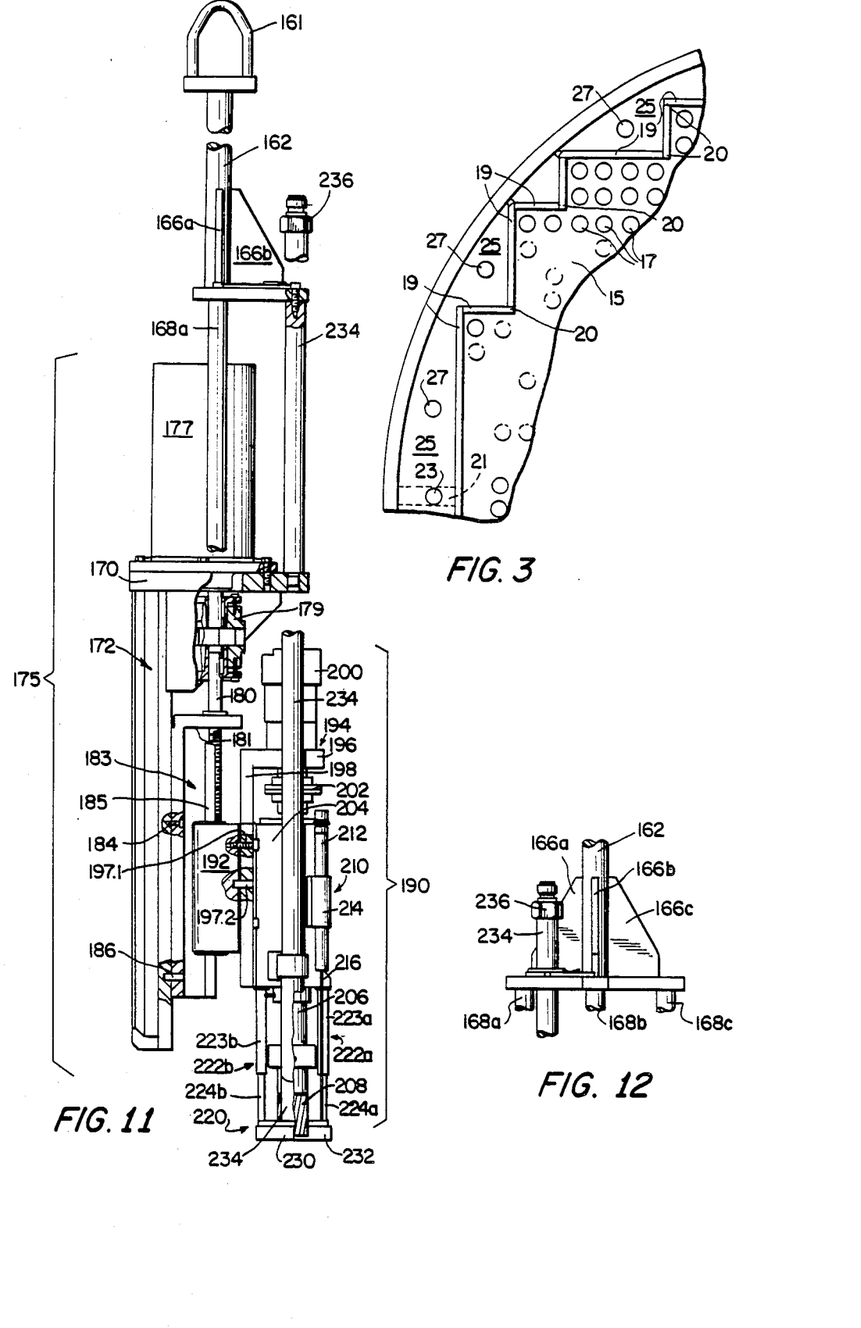
FIG. 3 is a plan view of the top former plate of the core barrel illustrated in FIGS. 1 and 2.
FIG. 11 is a partial cross-sectional side view of the rotabroach tool assembly of FIG. 9.
FIG. 12 is a front view of the top of the rotabroach tool assembly illustrated in FIG. 11.

With reference to FIGS. 1, 2 and 3, wherein like numerals denote like parts, both the apparatus and process of the invention are particularly adapted for modifying the flow of coolant through the core 1 of a nuclear reactor. In such reactors, the core 1 generally includes a reactor vessel 3 having both an inlet 5 and an outlet 7 for circulating a flow of liquid coolant through a plurality of nuclear fuel assemblies 29. In most instances, this coolant is water pressurized to about 2,250 psi.

More specifically, such reactor vessels 3 include a core barrel 9 having a plurality of lateral inlets 11 as well as bottom inlets 13 for conducting the stream of coolant from the inlet 5 through the fuel assemblies 29. The nuclear fuel assemblies generate heat which is transferred to the flow of coolant and ultimately used to generate power.

FIG. 1 illustrates the "conventional downflow pattern" of coolant flow through a nuclear reactor. In this downflow pattern, when the stream of coolant from inlet 5 reaches the lateral inlets 11 in the core barrel 9, the stream bifurcates. Some of the stream of coolant flows down between the inner wall of the core barrel 9 and a plurality of baffle plates 19. The balance of the stream of coolant flows down into the bottom fluid inlets 13, and up through the plurality of ports 17 in the lower core plate 15 of the core 1. The streams of coolant flowing through the lateral inlets 11 and the bottom inlets 13 ultimately converge in the space around the fuel assemblies 29 where they are heated en route to the outlet port 7.

As is best seen in FIG. 3, the configuration of baffle plates generally illustrated in FIG. 1 comprise a plurality of abutting plates 19 which are held adjacent the inner wall of the core barrel 9 by formers 21 having fluid-conducting bores 23. It should be noted that the baffle plates form what amounts to an angular flange around the perimeter of the top former plate 25 which has a plurality of corners 20. As previously stated, the plates 19 are only bolted together along the corners 20. Because there is no fluid seal between the abutting baffle plates 19, high pressure jets of coolant can squirt out between them as a result of the pressure differential which exists between the downflowing coolant on the outside surface of the baffle plates 19 from lateral inlets 11, and the upflowing coolant on the inside surface of the baffle plates from bottom inlets 13. These high pressure jets can impinge on the relatively fragile fuel rods in the fuel rod assemblies 29 and damage them by rattling them within their retaining grids.

To eliminate these high pressure jets of coolant, the invention modifies the conventional "downflow" coolant path illustrated in FIG. 1 to the "upflow" coolant path illustrated in FIG. 2. Specifically, all of the lateral inlets 11 of the core barrel 9 are first plugged, preferably with the core barrel plug disclosed in the previously referred to U.S. patent application Ser. No. 466,494, filed Feb. 15, 1983, and assigned to Westinghouse Electric Corporation. Such plugging causes all of the coolant to flow around to the bottom of the core barrel 9 and through the bottom inlets 13. Second, in order to establish a coolant flow path between the inside wall of the core barrel 9 and the outside walls of the baffle plates 19 (which will minimize any pressure differential in the coolant flowing on both sides of the baffle plates 19), a plurality of fluid flow paths in the form of bores 27 are made in the top former plate 25 which overlies the gap between the core barrel 9 and the baffle plates 19.

Figure 4:
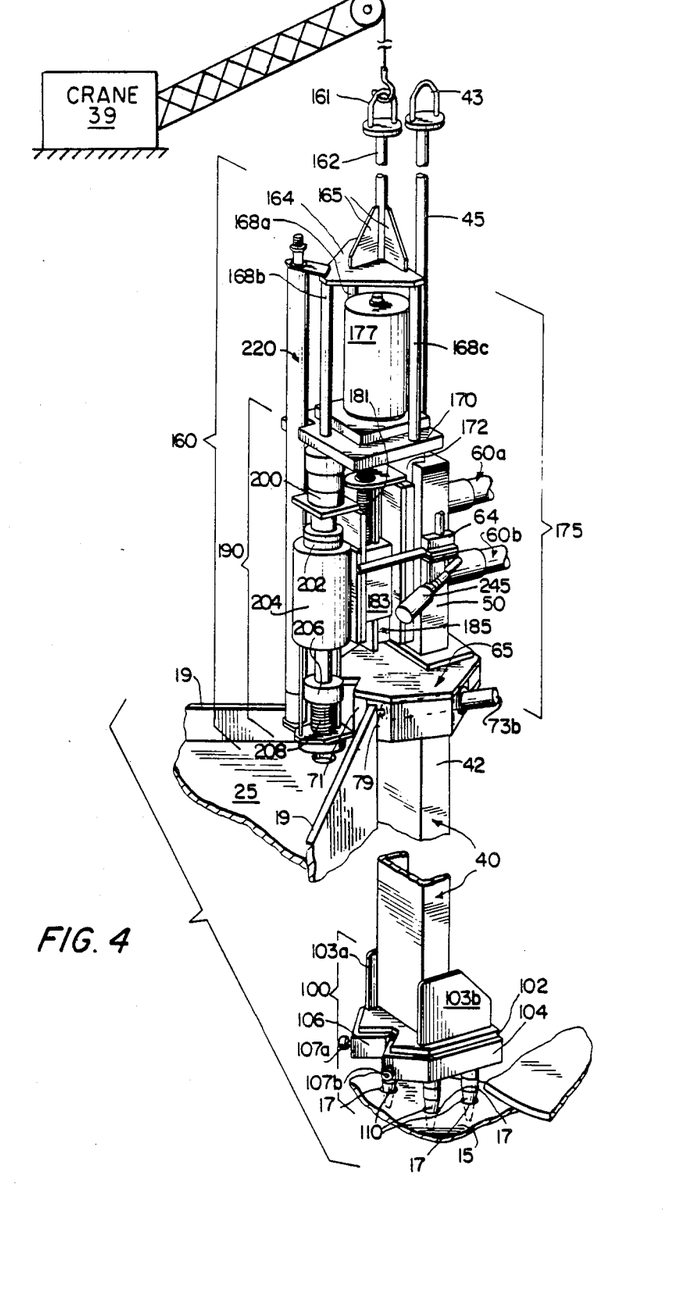
FIG. 4 is a perspective view of the tool support assembly of the invention wherein the rotabroach tool assembly is detachably mounted onto the tool mounting means of the invention.

The apparatus of the invention is particularly adapted for drilling these fluid-conducting bores 27. With specific reference now to FIG. 3, this apparatus generally comprises an elongated tool support assembly 40 having a tool support column 42 with a tool mounting means 48 on its top end, a clamping assembly 65 in its mid-portion for clamping the tool support assembly 40 onto a corner 20 formed by a pair of abutting baffle plates 19, and a base assembly 100 having four pins 110a, 110b, 110c and 110d which are seatable within the ports 17 of the lower core plate 15 for positioning the tool support assembly 40. The tool mounting means 48 includes a dovetail receiver 50 which may receive the dovetail fixture of either the rotabroach tool assembly 160 as shown in FIG. 4, or the ultrasonic transducer (or probe) assembly 115 or piercing tool assembly 140 shown in FIGS. 7 and 8, respectively. The rotabroach tool assembly 160 includes a feed assembly 175 having an electric feed motor 177 and gear assembly 179 which are coupled to a lead screw 181 threadedly engaged to a feed table 183. Feed assembly 175 moves the rotabroach drive assembly 190 toward or away from the top former plate 25, depending upon the direction in which electrical feed motor 177 turns lead screw 181. The rotabroach drive assembly 190 includes a hydraulic drive motor 200 connected to a drive shaft 205 via a flexible coupling 202 and bearing housing 204. The rotabroach drive shaft 205 is coupled to a tool holder 206 which may be coupled to either the broach 208 as shown, or a pilot drill bit.

In the process of the invention, a crane 39 (see FIG. 4) lowers the elongated tool support assembly 40 adjacent a corner 20 formed by a pair of abutting baffle plates 19. The pins 110a, 110b, 110c and 110d of the base assembly 100 are seated within the ports 17 of the lower core plate 15. Simultaneously, the clamping assembly 65 clamps onto a corner 20 formed by a pair of abutting baffle plates 19. After the tool support assembly 40 is properly positioned, the ultrasonic transducer assembly 115 is detachably mounted onto the tool mounting means 48 of the tool support assembly 40, and the precise thickness of the top former plate 25 is measured. Next, the ultrasonic transducer assembly 115 is replaced with the rotabroach tool assembly 160. A pilot hole is then drilled into the top former plate 25. The pilot drill bit is then replaced with a broach 208 which broaches an annulus to within approximately 0.030 inch from the bottom surface of the top former plate 25. The chip breaking and collecting means is then used to thoroughly clean the annulus created by the broach 208. Next, the rotabroach tool assembly 160 is replaced by the piercing tool assembly 140. The piercing tool assembly locks onto the slug by means of an expanding collet which is inserted into the pilot hole. The piercing tool assembly then cuts the thin web of metal which retains the slug in the top former plate 25, and then removes the slug. The hole is then deburred in accordance with a deburring tool (not shown) that includes a single deburring blade, and its own chip collecting means. The tool support assembly 40 is then moved to another corner 20, and the process is repeated until a sufficient number of holes 17 have been broached in the top former plate 15 to provide a flow path sufficiently wide enough to cancel any pressure differential across the baffle plates 19. The end result is the elimination of any jets of high pressure water which may have been discharged between abutting baffle plates 19 and onto the relatively delicate fuel rods of the fuel assemblies 29.

The Apparatus of the Invention

Figure 5:
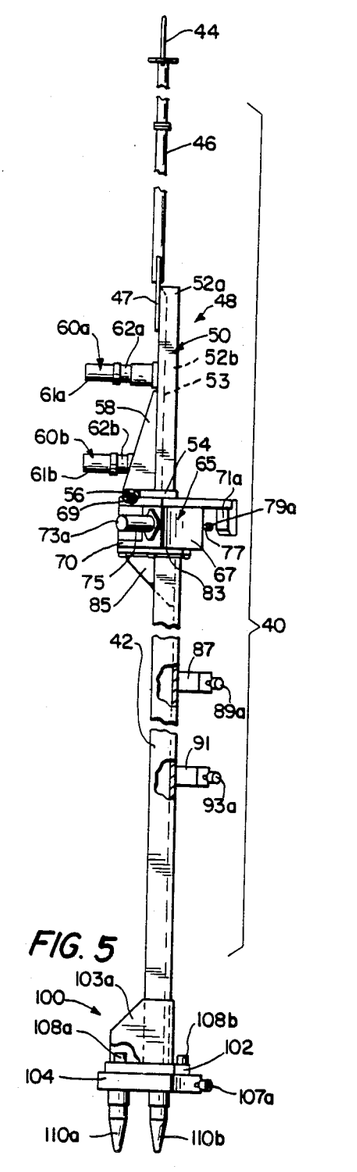
FIG. 5 is a side view of the tool support assembly of the invention.
Figures 6, 7:
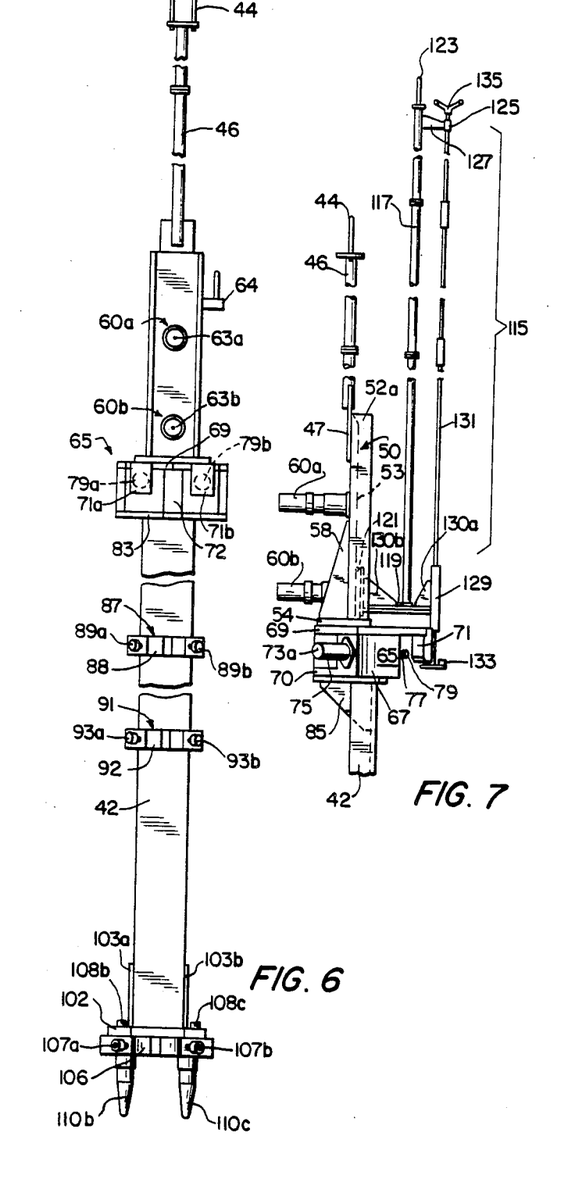
FIG. 6 is a front view of the tool support assembly of the invention.
FIG. 7 is a side view of the ultrasonic plate thickness detector of the invention detachably mounted onto the tool mounting means of the invention.

With specific reference now to FIGS. 5 and 6, the apparatus of the invention generally comprises an elongated tool support assembly (or "strongback") 40 onto which an ultrasonic transducer assembly 115, a piercing tool assembly 140, or a rotabroach tool assembly 160 may be detachably mounted.

At its upper portion, the tool support assembly 40 includes a tool mounting assembly 48 having a dovetail receiver 50 for detachably receiving a complementary dovetail fixture on the ultrasonic transducer assembly 115, the piercing tool assembly 140, and the rotabroach tool assembly 160. At its middle portion, tool support assembly 40 further includes a clamping assembly having a pair of orthogonally disposed braces 71a, 71b for gripping the sides of a pair of orthogonally disposed baffle plates 19. At its lower portion, tool support assembly 40 includes a tool support column 42 connected to the underside of the clamping assembly 65, and a base assembly 100 having a plurality of tapered pins 110a, 110b, 110c and 110d seatable within fluid port 17 of the lower core plate 15. Since the core barrel 9 is made out of stainless steel, all of the component parts of the apparatus of the invention are likewise formed out of stainless steel, in order to avoid the corrosion which would otherwise occur between dissimilar metals in an underwater environment. The elimination of such corrosion enhances the life and reliability of the apparatus, which are factors of major concern in a sealed, radioactive environment where maintenance and replacement operations are both dangerous and expensive. In order to prevent galling between adjacent stainless steel parts, all male threads of the apparatus are preferably hard-chrome plated.

The tool mounting means 48 comprises a dovetail receiver 50 having a pair of hydraulically-operated, locking dogs 60a, 60b mounted along its longitudinal axis as shown. Locking dogs 60a, 60b are each formed by a hydraulic motor 61a, 61b and a lead screw (not shown) coupled to the shaft of the motor which terminates in a pointed spindle 63a, 63b which is receivable within a complementary detent located in the back of the dovetail fixtures of the ultrasonic transducer assembly 115 and the rotabroach tool assembly 160. In the preferred embodiment, hydraulic motors 61a, 61b are a Model No. 128-0032 "M" Series motor, manufactured by the Eaton Corporation of Eden Prairie, Minn. The hydraulic motors 61a, 61b are powered by hydraulic lines (also not shown) having quick-disconnect fixtures to enhance the portability of the tool support assembly 40. The use of a hydraulically-operated lead screw and pointed spindle 63a, 63b in the locking dogs 60a, 60b in lieu of a simple piston and cylinder type mechanism allows these dogs 60a, 60b to retain a positive locking pressure on the particular tool in the tool support assembly 40 even if the hydraulic power to the locking dogs should fail.

The dovetail receiver 50 of the tool mounting assembly 48 is formed by a pair of retaining flanges 52a, 52b symmetrically disposed at an acute angle to the flat back of the receiver 50. These flanges 52a, 52b define a dovetail slot 53. A bracket 64 is mounted near the upper portion of retaining flange 52b, in order to detachably mount a closed-circuit television camera 245 onto the tool support assembly 40 in the position illustrated in FIG. 4. At the top of the dovetail receiver 50, a connecting plate 47 couples a lifting bail rod 46 which terminates in a lifting bail 44. The lifting bail 44 is engageable with the lifting hook of a crane (not shown) which positions the entire tool support assembly 40 in a desired location over the top former plate 25.

The bottom of the dovetail receiver 50 includes a base plate 54 and gusset plate 58 which are bolted to the top plate 69 of the clamping assembly 65 by bolts 56.

The clamping assembly 65 of the tool support assembly 40 generally includes a clamp housing 67 having a pair of orthogonally-disposed screw clamps 73a, 73b mounted therein, as well as a top plate 69, and a bottom plate 70. The bottom plate 70 is bolted onto a support plate 83 having a reinforcing gusset 85 which joins tool support column 42 to the underside of the assembly 65. The front portion of the top plate 69 has a mitre-shaped recess or notch to which a pair of braces 71a, 71b are mounted in orthogonal relationship. The two braces 71a, 71b form what amounts to a right-angular flange receivable in the corners 20 formed by abutting baffle plates 19 (see FIG. 3). The housing 67 of the clamp assembly 65 contains a pair of orthogonally disposed, hydraulically-operated screw clamps 73a, 73b. The structure of the screw clamps 73a, 73b is similar to that of the previously described locking dogs 60a, 60b, in that each includes a hydraulic motor 75a, 75b which turns a lead screw connected to a spindle 77a, 77b. In the preferred embodiment, the motors 75a, 75b are Model No. 101-1040 hydralic motors, manufactured by the aforementioned Eaton Corporation of Eden Prairie, Minn. However, instead of terminating in a point, the spindles 77a, 77b of the screw clamps 73a, 73b terminate in leveling pads 79a, 79b as shown. The leveling pads 79a, 79b are connected to their respective spindles 77a, 77b by means of a ball joint (not shown) which allows a limited amount of swiveling between the pads and the spindles. Such a swiveling action assists the clamping assembly 65 in snugging up to one of the corners 20 formed by abutting baffle plates 19 when the braces 71a, 71b are hooked over the sides of the corner 20, and the screw clamps 73a, 73b are extended. Again, the use of a hydraulically-operated screw mechanism, in lieu of a simple piston and cylinder mechanism, allows the clamps 73a, 73b to exert a positive clamping force onto the baffle plates 19 even if the hydraulic power thereto should fail. As is the case with locking dogs 60a, 60b, hydraulic lines having quick-disconnect couplings (not shown) bring the hydraulic motors 75a, 75b of the screw clamps 73a, 73b into communication with a source of hydraulic power.

The tool support column 42 generally includes a C-channel section member made from standard, stainless steel stock material. The C-channel section member is approximately 30 feet long, and includes a pair of guide plates 87 and 91 along its longitudinal axis as shown.

Like the front of the top plate 69 of the clamping assembly 65, each of the guide plates 87 and 91 includes a mitre-shaped recess in its front side for receiving a corner 20 formed by a pair of abutting baffle plates 19. In order to facilitate the longitudinal positioning of the tool support assembly 40 against the corner 20. Each of the guide plates 87 and 91 includes a pair of guide rollers 89a, 89b and 93a, 93b on either side of their respective mitre-shaped recess. These guide rollers rollingly engage the outside walls of the corner 20 when the tool support assembly 40 is lowered in place. The bottom of the tool support column 42 is bolted to the base assembly 100 via connecting plate 102 as shown.

The base assembly 100 comprises a base plate 104 having four tapered pins 110a, 110b, 110c and 100d extending from its bottom. The front side of the base plate 104 has a mitre-shaped recess 106 with a pair of guide rollers 107a, 107b on either side for receiving a corner 20 in the same manner as the previously described guide plates 87 and 91. On its top, bolts 108a, 108b, 108c and 108d fasten base plate 104 to the previously-mentioned connecting plate 102, which couples the end of the tool support column 42 onto the base assembly 100. The base assembly 100 further includes a pair of reinforcing gussets 103a, 103b on either side of the connecting plate 102 which are welded onto the end of the tool support column 42 and the top surface of the connecting plate 102. These reinforcing gussets 103a, 103b strengthen the connection between the tool support column 42 and the base assembly 100. As will be discussed in more detail hereinafter, the tapered pins 110a, 110b, 110c and 110d are seatable within the ports 17 of the lower core plate 15.

With reference now to FIG. 7, the ultrasonic transducer assembly 115 of the invention generally comprises a support column 117 connected to a base plate 119, having a dovetail fixture 121 receivable with the dovetail receiver of the tool support assembly 40. Although not specifically shown in FIG. 7, the bottom of the dovetail fixture 121 is tapered so that the operator can easily insert the bottom of the dovetail fixture into the top of the dovetail receiver 50. Additionally, the dovetail fixture 121 includes one detent (also not shown) which is mateable with the pointed spindle 63b of the locking dog 60b. It should be noted that the dovetail fixture of the rotabroach tool assembly 160 of the invention includes a pair of detents which are mateable with the pointed spindles 63a, 63b of both the locking dogs 60a, 60b. At its upper portion, the support column 117 terminates in a lifting bail 123 engageable with the hook of the aforementioned crane. Just below the lifting bail 123, a bracket 127 mounts a top alignment sleeve 125 having a bore (not shown) through which the transducer handling shaft 131 for the ultrasonic transducer 133 slidably and rotationally extends. The base plate 119 of the ultrasonic transducer assembly 115 includes a bottom alignment sleeve 129 connected thereto by means of a reinforcement gusset 130. Like top alignment sleeve 125, the bottom alignment sleeve 129 includes a centrally-disposed bore (also not shown) through which the transducer handling shaft 131 of the ultrasonic transducer 133 slidably and rotationally extends. Finally, the top of the transducer handling shaft 131 includes a handle 135 for rotating the ultrasonic transducer 133 in a variety of angular positions on the surface of top former plate 25. In the preferred embodiment, ultrasonic transducer 133 is a standard contact transducer manufactured by the Panametrics Corporation of Waltham, Mass. The ultrasonic transducer 133 is retained by a transducer disc, which allows the probe to follow variations in the top former plate surface. The probe 133 is spring-loaded to assure that the probe is always in contact with the top former plate 25.

Figure 8:
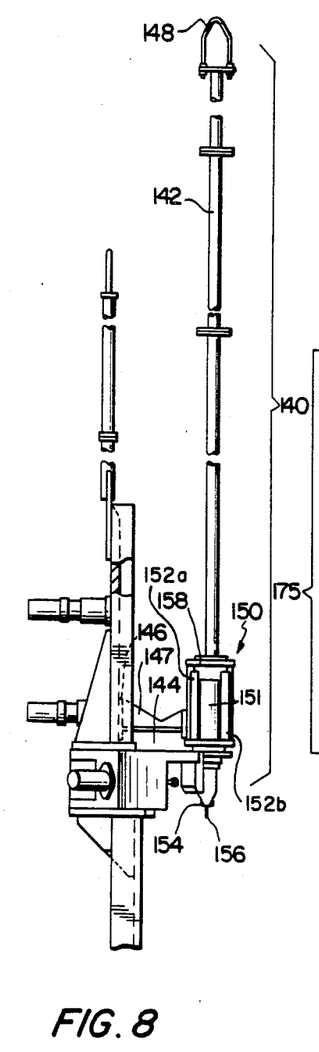
FIG. 8 is a side view of the piercing tool of the invention mounting onto the tool mounting means of the invention.

FIG. 8 illustrates the piercing tool assembly 140 of the invention. In general terms, assembly 140 includes a piercing tool 150 having a dovetail fixture 146 connected to the cage 158 of the tool 140 by means of a base plate 144, and a reinforcing flange 147. FIG. 8 illustrates the dovetail fixture 146 inserted in the dovetail receiver 50 of the tool support assembly 40. At its top portion, piercing tool 150 has a support shaft 142 which terminates in a lifting bail 148; at its bottom portion, it includes a set of retractable piercing blades 152 and an expandable collet 156. The expandable collet 156 includes a rod slidably engaged within the center of the collet which terminates in a frustro-conical member (also not shown). This rod is connected to a double action, hydraulic cylinder 151 which is centrally disposed within the cage 158 of the tool. The piercing blades 154 are operatively connected to four hydraulic cylinders 152a, 152b, 152c and 152d (of which only 152a and 152b are visible) which are capable of extending the piercing blades 154. In its unexpanded position, the collet 156 is small enough to slide into a pilot hole drilled into the slug formed in the top former plate 25 by the rotabroach tool assembly 160. However, in its expanded position, the collet 156 is capable of firmly holding the slug in place while the four hydraulic cylinders 152a, 152b, 152c and 152d extend the piercing blades 154 against the small web of metal which the rotabroach assembly 160 leaves between the slug and the bottom of the top former plate 25. Thus engaged, the piercing blades 154 cut through this thin web of metal in much the same fashion that a can opener works. In an alternate embodiment of the invention, a tapered, self-tapping screw may be used in lieu of expanding collet 156.

Figure 9:
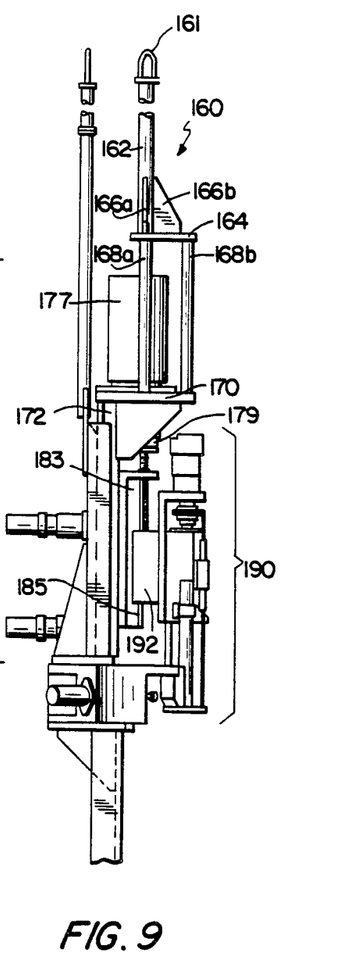
FIG. 9 is a side view of the rotabroach tool assembly of the invention detachably mounted onto the tool mounting means.
Figure 10:
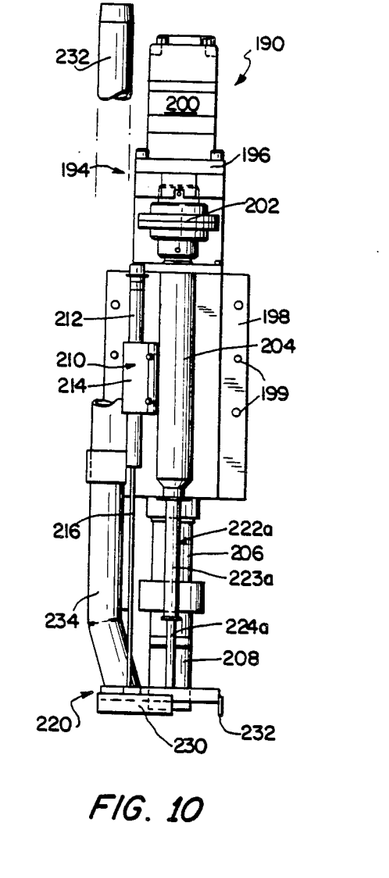
FIG. 10 is a front view of the rotabroach drive assembly of the invention.

With reference now to FIGS. 9, 10 and 11, the apparatus of the invention further comprises a rotabroach tool assembly 160 having a feed assembly 175 for extending and retracting the rotabroach tool from the plate 25, and a drive assembly 190 for rotating the broach 208 into the top surface of the top former plate 25. FIGS. 9 and 10 illustrate the rotabroach tool assembly 160 as it appears when attached onto the tool support assembly 40. FIG. 11 is a more detailed view of the rotabroach tool assembly 160 apart from the tool support assembly 40.

More specifically, the rotabroach tool assembly 160 includes a support shaft 162 which is connected to a lifting bail 161 at its top end, and a top support plate 164 at its bottom end. Three gusset plates 166a, 166b and 166c help secure the support shaft 162 to the support plate 164. The top support plate 164 is connected to a bottom support plate 170 by means of three support columns 168a, 168b and 168c. The assembly 160, like the ultrasonic transducer assembly 115 and the piercing tool assembly 140, includes a dovetail fixture 172 tapered at its bottom end to facilitate the insertion of the fixture 172 into the dovetail receiver 50 of the tool support assembly 40. Dovetail fixture 172 also includes a pair of detents (not shown) which are complementary to the pointed spindles 63a, 63b of the locking dogs 60a, 60b.

The feed assembly 175 of the invention includes an electrical feed motor 177 which is connected to the bottom support plate 170 of the rotabroach tool assembly 160. Extending below the support plate 170 is a lead screw gear assembly 179 which is coupled to the output of the electrical feed motor 177. In the preferred embodiment, feed motor gear and gear assembly 179 are a Model No. E 652-006-205 combination motor and gear assembly manufactured by Electro-Craft Corporation of Hopkins, Minn. Such a combination electric motor and gear assembly includes an electric encoder which generates a signal indicative of the number of times the output shaft of the gear assembly turns. A lead screw 181 is connected to the output of the gear assembly 179 via shaft 180. This lead screw extends below the gear assembly 179 to longitudinally position the drive assembly 190 of the rotabroach tool, in a manner to be described in more detail hereinafter. The feed assembly 175 further includes a feed table 183 connected to the dovetail fixture 172 of the rotabroach tool 160 by means of appropriate bolts 184 and pins 186, respectively.

The drive assembly 190 includes a saddle 192 having a dovetail slot which is slidably engageable with the dovetail rail 185 of the feed assembly 175, as well as a threaded bore (not shown) which is threadedly engageable with the lead screw 181 of the feed assembly 175. Hence, the electrical feed motor 177 is capable of longitudinally moving the drive assembly 190 toward or away from the top former plate 25, depending upon the direction of rotation of lead screw 181. Since the electric motor of the preferred embodiment includes an electric encoder, the signal generated by this encoder can be used to compute the distance between the cutting edge of the broach 208 and the bottom surface of the top former plate if the pitch of the thread of the lead screw 181 is known. This encoder system is redundant to the function of the linear variable differential transformer assembly 210, described in detail hereinafter.

With specific reference now to FIGS. 10 and 11, the drive assembly 190 of the invention comprises the previously mentioned saddle 192, and a support bracket 194 having a top flange 196, and a bottom flange 198 which is connected to the saddle 192 by means of appropriate bolts 197.1 inserted through bolt holes 199, as well as dowel pins 197.2. A hydraulic drive motor 200 is connected to the top flange 196 of the support bracket 194. In the preferred embodiment, hydraulic motor 200 is a "Char-Lynn 2000 104-1228" motor, manufactured by the aforementioned Eaton Corporation of Eden Prairie, Minn. A flexible coupling 202 connects the shaft of the hydraulic drive motor 200 to a drive shaft 205 journalled within bearing housing 204. The flexible coupling 202 insulates the hydraulic drive motor 200 from the shock loading it would otherwise experience upon a sudden binding of the broach 208 within the top former plate 25. In the preferred embodiment, flexible coupling 202 is a Model No. 40T 20 coupling, manufactured by the Falk Corporation of Milwaukee, Wisc. The drive shaft within the bearing housing 204 is coupled to a tool holder 206. The tool holder 206 includes a hinge key and locking sleeve for locking onto the shaft of either a pilot drill bit (not shown) or the broach 208. More specifically, both the shafts of the pilot drill bit and the broach 208 are generally circular, with a chordal section removed therefrom. The hinge key and locking sleeve of the tool holder 206 snugs a flat piece of metal across the chordal section of the shaft, thereby preventing rotary motion between the holder 206 and the bit or broach 208. Although any one of a number of conventional tool holders may be used in lieu of the aforementioned mechanism, a hinge key and locking sleeve mechanism is preferred because it allows a quick and easy changeover from one bit to another.

The rotabroach is a full-fluted broach 208 which helps direct the chips and slivers it creates to the top of the broach. The broach 208 includes a gland near its top which directs the coolant liquid down the center of the bit and up the flutes. This fluid action cools the broach tip and forces the chips and slivers out of the annulus created by the broach 208. Although not shown in detail, a cooling fluid such as water is pumped at approximately 70 psi through the cooling gland of the broach 208. The fluid cooling system of the broach 208 is conventional, and constitutes no part of the instant invention.

In order to accurately monitor the relative positions of the cutting edge of the broach 208 and the bottom surface of the top former plate 25, a linear variable differential transformer assembly 210 is mounted onto the bearing housing 204 of the drive shaft 205. The transformer assembly 210 includes a coil housing 212, which is mounted onto the bearing housing 204 by means of a clamp 214. The transformer assembly 210 further includes a stainless steel rod 216 which is slidably movable along the longitudinal axis of the coil within the coil housing 212 at its top end, and rigidly mounted onto the chip collection nozzle 229 of the chip breaking and collection assembly 220. In the preferred embodiment, the transformer assembly 210 is preferably formed from a Model No. 2000 HPA linear variable differential transformer manufactured by the Shaevitz Engineering Company of Pennsauken, N.J. The transformer assembly 210 works by virtue of the fact that the stainless steel rod 216 alters the magnetic field within the coil housing 212 as it slides upwardly therethrough incident to the broaching process. By monitoring these changes in the magnetic field within the coil housing 212, the distance between the cutting edge of the broach 208 and the bottom surface of the top former plate 25 can be determined with a few thousandths of an inch.

Figure 13:
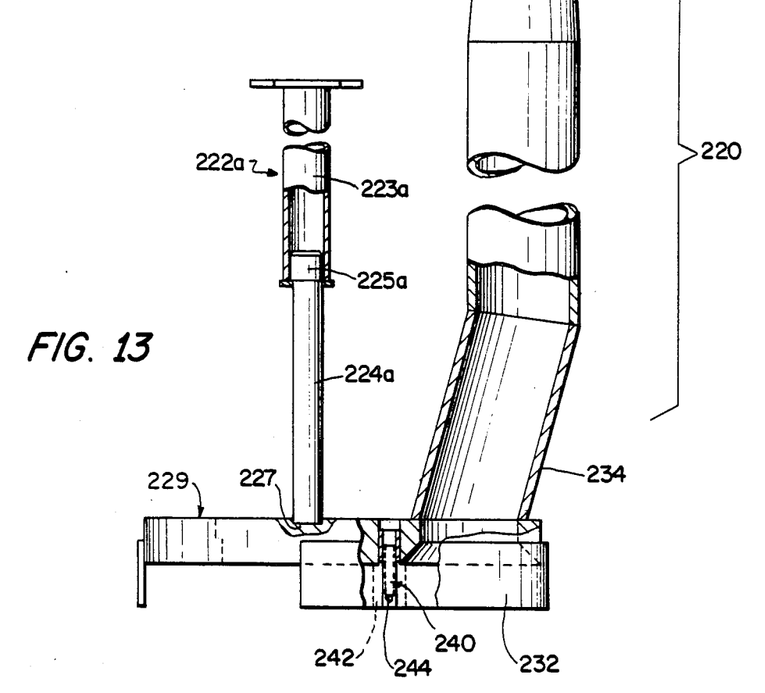
FIG. 13 is a partial cross-sectional view of the chip breaking and collecting system of the invention.
Figure 14:
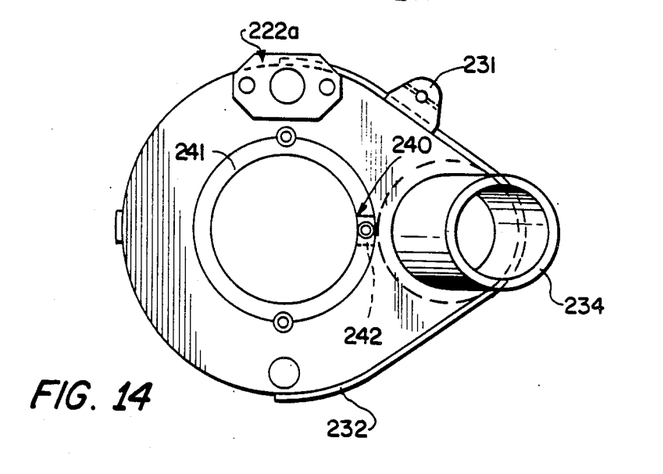
FIG. 14 is a plan view of the chip breaking and collecting system illustrated in FIG. 13.

The rotabroach tool assembly 160 also includes a chip breaking and collecting assembly 220 which may best be seen in FIGS. 11, 13 and 14. The chip breaking and collecting assembly 220 removes metal chips produced both by the pilot drill bit and the broach 208 which would otherwise fall into the core barrel 9 of the nuclear reactor vessel, and scour and damage the inside of the coolant pumps (not shown) of the reactor. The chip breaking and collecting assembly 220 generally comprises an annularly-shaped chip collection nozzle 229 which circumscribes the broach 208. Nozzle 229 is connected to the bottom of the bearing housing 204 by means of a pair of telescoping support tubes 222a, 222b. Each of the telescoping support tubes includes a hollow upper tube 223a, 223b into which a lower tube 224a, 224b terminating in a stop member 225a, 225b is slidably engaged. The telescoping support tubes 222a, 222b are extended to their maximum length when their stop members 225a, 225b are engaged against the end caps of the respective upper tubes 223a, 223b. It should be noted that only support tube 222a is shown in FIGS. 13 and 14 in order to simplify these particular views of the invention. The bottom end of each of the lower tubes 224a, 224b is welded into the upper surface of the chip collection nozzle 229 as may best be seen with reference to FIG. 13.

The chip collection nozzle 229 includes a skirt 232 which extends around approximately half of the perimeter of the nozzle 229 as shown. The top surface of the chip collection nozzle 229 includes a chip collection pipe 234 which terminates in a quick-disconnect hydraulic fitting 236 mounted on the top support plate 164 of the rotabroach tool assembly 160. Generally speaking, the metal chips and slivers generated by the broach 208 and pilot drill bit are sucked up through the nozzle 229 and up through the chip collection pipe 234 during the drilling or broaching process.

With specific reference now to FIGS. 13 and 14, the chip breaking and collecting assembly 220 also includes a chip breaker 240. The chip breaker 240 is formed from a generally square piece of hardened tool steel which is mounted flush with the inner annulus of the chip collection nozzle 229 via chip breaker support ring 241, and retaining pin 244. As previously stated, the broach 208 includes flutes which tend to drive the chips and slivers resulting from the broaching process up against the outside walls of the broach 208. The breaker blade 244 is mounted close enough to the outer wall of the broach 208 that it cuts up the long, thin shavings of stainless steel which are sent up along the outer walls of the broach into pieces ranging from 1/16 inch to ¼ inch in length. Since these pieces are considerably smaller than the inner diameter of the chip collection pipe 234, the possibility of these chips "damming" the pipe 234 is very small.

Finally, as may best be seen with reference back to FIG. 3, the apparatus of the invention includes a closed-circuit television camera 245 which is detachably mountable onto bracket 64 for visually monitoring the broaching process to make sure that no metal chips or slugs enter the water in the core barrel 9.

In the preferred embodiment, the television camera 244 is a Westinghouse Elmira-brand underwater closed-circuit television camera.

Process of the Invention

As previously explained, the process of the invention generally involves changing the coolant flow through a nuclear reactor core from a conventional "downflow" pattern into the upflow pattern illustrated in FIG. 3, by first plugging the lateral ports 11 of the core barrel, and then boring a plurality of holes through the top former plate 25 by means of the apparatus of the invention. The end result of the process is that coolant from inlet 5 can flow unimpeded through the ports 17 of the lower core plate 15, between the baffle plates 19 and the walls of the core barrel 9, and out through the top former plate 27 and ultimately through outlet 7.

Figure 15:
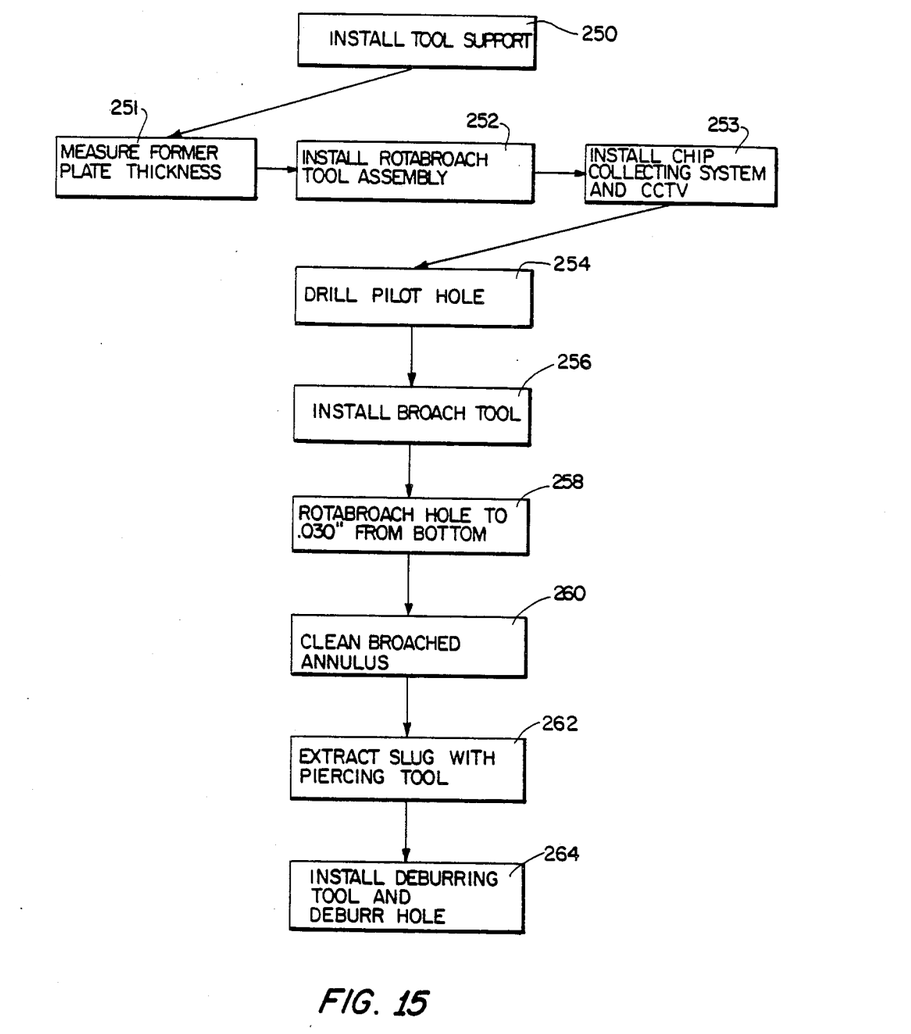
FIG. 15 is a flow chart illustrating the process of the invention.

FIG. 15 is a flow chart illustrating the more specific process of boring holes through the top former plate 25 by means of the apparatus of the invention. In the first step 250 of this process, the tool support assembly 40 is installed in proper position along a corner 20 formed by a pair of abutting baffle plates 19. In this first step of the process, a crane (which is preferably a polar crane) suspends the tool support assembly 40 by its lifting bail 44. The back side of the tool support assembly 40 is made slightly heavier than the front side by the temporary attachment of a counterweight (not shown) thereon, so that the base assembly 100 of the tool support assembly 40 tends to cant forward slightly, thereby facilitating engagement between the guide rollers 107a, 107b of the base plate 104 of the base assembly against the outside of a corner 20 formed by a pair of abutting baffle plates 19. As the tool support assembly 40 is lowered farther into the water of the core barrel 9, the guide rollers 93a, 93b and 89a, 89b of the guide plates 91 and 87 likewise engage and roll down the outside of the corner 20 until the tapered pins 110a, 110b, 110c and 110d become seated in the ports 17 of the lower core plate 15 which are adjacent the corner 20. At the same time, the braces 71a, 71b of the clamping assembly 65 slide over the inside walls of the corner 10 in overhanging engagement. To complete the installation of the tool support assembly 40 onto corner 20, the hydraulically operated screw clamps 73a, 73b are actuated so that their respective leveling pads 79a, 79b forcefully engage the outside surfaces of the baffle plates 19 forming the corner 20, thereby snugging the braces 71a, 71b against the inside surfaces of these plates.

In the next step 251 of the process, the thickness of the top former plate 25 is measured by means of the ultrasonic transducer assembly 115. Because the top former plates 25 are formed by a rolling process, the thicknesses of individual plates 25 may vary significantly. Hence, individual thickness measurements are necessary for each hole if the broach 208 is to consistently get within 0.030 inch of the bottom surface of the plate 25. If the web between the slug formed by the broach 208 in the bottom of the top former plate 25 is greater than 0.030 inch, the piercing tool assembly 140 may have difficulty in cutting this web and removing the slug. Additionally, the cutting of such a thick web would leave large burrs around the hole, which is undesirable. If, on the other hand, the broach 208 penetrates completely through the top former plate 25, the results are even worse, since a relatively large amount of metal chips and slivers would almost certainly fall into the core barrel and damage the coolant pumps and other reactor components. In measuring the plate thickness with the ultrasonic tool 115, it should be noted that the operator generally twists the transducer handling shaft 131 by means of handle 135 to four positions approximately 90° apart, to insure an accurate thickness reading throughout the entire area of the plate 25 to be broached.

In the next step 252 of the process, the ultrasonic transducer assembly 115 is removed from the tool support assembly 40, and the rotabroach tool assembly 160 is slid therein with a pilot hole drill in its tool holder 206. In the next step 253 of the process, the chip breaking and collecting system 220 is installed by connecting a suction pipe to quick-disconnect hydraulic fitting 236, and the closed-circuit television camera 253 is mated onto its bracket 64 extending off the tool mounting means 48. The closed-circuit television camera 245 allows the operator of the invention to continuously visually monitor the process to make sure that no metal chips get into the core barrel 9 due to a malfunction of the chip breaker 240 or some other component part of the apparatus of the invention.

In the next step 254 of the process, the rotabroach tool assembly 160, fitted with a pilot drill bit, drills a pilot hole into the plate 25. In drilling the pilot hole, the hydraulic drive motor 200 of the drive assembly 190 is actuated, and the entire drive assembly 190 is screwed toward the top surface of the top former plate 25 by the lead screw 181 coupled to the electrical feed motor 177 of the feed assembly 175. It should be noted that the pilot drill does not penetrate completely through the top former plate 25, but only drills far enough for the expanding collet 156 of the piercing tool 140 to gain a secure grip onto the slug formed by the broach 208. After the pilot hole is drilled, the electric motor 177 of the feed assembly 175 reverses its direction so that the lead screw 181 withdraws the drive assembly 190 from the top surface of the top former plate 25. The pilot drill in the tool holder 206 in the drive assembly 190 is then replaced with a broach 208, as indicated in process step 256.

In the next step 258 of the process, the electric motor 177 of the feed assembly 175 is allowed to push the broach 208 of the drive assembly 190 to within 0.030 inch from the bottom surface of the plate 25. In this step of the process, the operator carefully monitors the progress of the broaching tool through the plate 25 by means of the linear variable differential transformer 210, which continuously informs the operator how far the cutting edge of the broach 208 is from the bottom surface of the plate 25. While the hole is being broached, it should be noted that the chip breaking and collecting assembly 220 is continuously breaking the chips and shavings created by the teeth of the broach 208 into fragments smaller than the diameter of the chip collection pipe 234, so that these fragments may be easily sucked through the pipe 234 without "damming up".

In the next step 260 of the process, the broached annulus formed by the broach 208 is cleaned of metal chips and shavings by withdrawing the broach 208 above the top surface of the former plate 25, while maintaining the annularly shaped chip collection nozzle 229 on the annulus.

In the final steps 262, 264 of the process, the rotabroach tool assembly 160 is replaced with the piercing tool assembly 140, and the slug in the center of the annulus is removed by inserting the expanding collet 156 of the tool 150 into the pilot hole, and expanding it to lock the slug onto the tool. Next, the piercing blades 154 of the tool 150 cut the thin, 0.030 inch thick web around the slug in "can-opener" fashion. The use of such a "can-opener" type of mechanism and action advantageously minimizes the amount of metal chips and slivers created by the cutting of the final web of metal between the annulus and the bottom surface of the plate 25. The piercing tool assembly 140 and slug are then removed from the tool support assembly 40, and the resulting hole is deburred. Although not specifically illustrated, the deburring tool used to implement the invention includes a single rotating deburring blade which is canted at about a 23° angle, and which has a chip collecting nozzle similar to the nozzle 229 used in connection with the chip breaking and collecting assembly 220 of the rotabroach tool assembly 160. The use of a 23° blade advantageously creates fluid currents in the water surrounding the broached hole which assist the chip collecting nozzle mechanism of the deburring tool in performing the its function. Additionally, the deburring tool may employ an expanding collet mechanism which is insertable into the broached hole and which locks the entire deburring tool into plate. The expanding collet of the deburring tool may expand when a hydraulic cylinder retracts a draw bar against a tapered, inside wall in the collet, in a fashion similar to the way collet 156 of piercing tool 140 expands.

What is claimed is:

1. A tooling system for providing an alternate flow path for a coolant in a nuclear reactor having a core barrel, and a top former plate overlying said barrel, comprising:
   a portable tool support assembly positionable within the core barrel and having a tool mounting means for sequentially and detachably mounting a plurality of tools for boring a hole through said plate including a boring tool means having a chip collection means for boring a hole substantially through said top former plate while preventing the chips from falling into the core barrel.

2. The system as defined in claim 1, wherein the core barrel includes a perforated floor, and said tool support assembly includes a base with at least one pin at its bottom end seatable within a perforation in said core barrel floor for positioning and securing said tool support assembly at a desired location.

3. The system defined in claim 1, wherein the core barrel contains an array of abutting baffle plates, and wherein the tooling system further includes a clamp assembly having at least one brace member for positioning and aligning the tool mounting means of said tool support assembly over a pair of abutting baffle plates adjacent said top former plate.

4. The system defined in claim 3, wherein said clamp assembly includes at least two biasing means for biasing said brace member toward a corner formed by a pair of abutting baffle plates, thereby attaching said brace member in said corner and positioning and aligning said tool support assembly.

5. The system defined in claim 1, further including a positioning means for positioning said tool support assembly, and wherein said tool support assembly includes an engagement means detachably engageable with said positioning means.

6. The system defined in claim 5, wherein said engagement means is a lifting bail, and said positioning means is a crane having a hook engageable with said bail.

7. The system defined in claim 1, wherein said tool support assembly includes a pair of aligning means located below said clamp assembly for aligning said tool support assembly with a baffle plate.

8. The system defined in claim 7, wherein each of said pair of aligning means includes a guide plate.

9. A tooling system for providing an alternate flow path for a coolant in a nuclear reactor having a core barrel with a perforated floor, and a top former plate overlying said barrel, comprising:
(a) a portable tool support assembly positionable within the core barrel having a tool mounting means for sequentially and detachably mounting
  (i) a boring tool means for boring a hole substantially through the top former plate that includes a chip collection means for collecting the chips created by said boring tool to prevent said chips from falling into the core barrel, and
  (ii) a piercing tool assembly for completing the hole created by the boring tool with a minimum amount of chips;
(b) a clamp assembly for securing and positioning said tool mounting means over the top former plate, and
(c) a base having at least one pin seatable in one of the perforations of the floor of said core barrel for securing and positioning said tool support assembly.

10. The system defined in claim 9, further including a detecting means for detecting the thickness of said top former plate, said detecting means being sequentially and detachably mountable on said tool mounting means.

11. The system defined in claim 10, wherein said detecting means includes an ultrasonic transducer.

12. The system defined in claim 9, wherein said boring tool means includes a feed and drive assembly for driving a machine tool and moving it toward said top former plate.

13. The system defined in claim 12, wherein said machine tool is a drill bit for drilling a pilot hole in said top former plate.

14. The system defined in claim 12, wherein said machine tool is a rotabroach bit for boring a hole substantially through said top former plate.

15. The system defined in claim 9, wherein said chip collecting means includes a chip breaker.

16. The system defined in claim 12, wherein said feed and drive assembly includes monitoring means for monitoring the distance between said machine tool and said top former plate.

17. The system defined in claim 16, wherein said monitoring means includes a linear variable differential transformer.

18. The system defined in claim 16, wherein said monitoring means includes a television camera.

19. The system defined in claim 9, wherein the core barrel contains an array of abutting baffle plates, and said clamp assembly includes at least one brace for positioning and aligning said tool support assembly with a corner formed by two abutting baffle plates.

20. The system defined in claim 19, wherein said clamp assembly includes at least two biasing means for biasing said brace toward said corner formed by said abutting baffle plates, thereby attaching said brace in said corner and positioning and aligning said tool support assembly.

21. The system defined in claim 9, wherein said tool support assembly includes a pair of aligning means located below said clamp assembly for aligning said tool support assembly with a corner formed by two abutting baffle plates.

22. The system defined in claim 21, wherein each of said pair of aligning means includes a guide plate.

23. The system defined in claim 9, wherein said tool mounting means includes at least one locking means detachably mountable with said boring tool means and said piercing tool assembly.

24. The system defined in claim 23, wherein said locking means includes at least one hydraulically operated locking dog.

25. An improved process for diverting the direction of flow of coolant in a nuclear reactor which has a core barrel with lateral ports which normally conduct a downflow of the coolant between the core barrel and a set of core baffle plates, and a top former plate overlying the core barrel, comprising the steps of plugging the lateral ports of the core barrel to prevent a downflow of coolant between the core barrel and the core baffle plates, boring a coolant flow path through the top former plate of the reactor, and preventing chips produced by the boring from falling into the core barrel.

26. The improved process defined in claim 25, wherein said coolant flow path is provided by boring a plurality of holes through said top former plate.

27. The improved process defined in claim 26, wherein said holes are bored by means of a tool system including an elongated tool support assembly.

28. The improved process defined in claim 27, wherein said elongated tool support assembly includes a tool mounting means for detachably mounting at least one boring tool means which includes a chip collection means for collecting the chips that result from the boring of the top former plate.

29. A process for providing an alternate coolant flow path in a nuclear generator having a core barrel containing an array of abutting baffle plates, and a top former plate having a top side and a bottom side by means of a tooling system including a tool support assembly having a tool mounting means for detachably mounting at least one tool in the vicinity of the top former plate, a clamp assembly engageable with a corner of the baffle plates for securing and positioning said tool mounting assembly, and a positioning means for positioning said tool support member at a plurality of positions along said baffle plates, comprising the steps of:

(a) positioning said tool support member at a desired position along said baffle plates with said positioning means;

(b) clamping said tool support member into position on a corner formed by said baffle plates with said clamping assembly;

(c) detachably mounting a boring tool means having a chip collection means onto said tool mounting means, and (d) boring a hole into the top side of said top former plate while collecting the resulting chips with the chip collection means.

30. The process defined in claim 29, further including the steps of unclamping said clamping assembly from said baffle plates, moving said tool support member to a different position on said baffle plates, and repeating the defined process.

31. The process defined in claim 29, further including the step of detachably mounting a plate thickness detector onto said tool mounting means before said boring tool means is detachably mounted, and measuring the thickness of the top former plate in order to avoid boring completely through said top former plate.

32. The process defined in claim 31, further including the step of detachably mounting a piercing tool assembly onto the tool mounting means after removing said boring tool means from the tool mounting means, and cutting the remaining material out of the bore with a minimum of chips in order to extend said hole completely through said plate.

33. The process defined in claim 31, further including the step of installing a tool monitoring means onto said tool mounting means before boring said hole.

34. The process defined in claim 33, wherein said monitoring means is a television camera.

35. The process defined in claim 29, wherein said hole boring step includes boring a pilot hole in the top side of the plate with a drill, and then boring a wider hole with a rotabroach bit.

36. The process defined in claim 35, wherein said hole is only rotabroached to between about 0.1 and 0.01 inch from the bottom side of the plate, thereby leaving a thin portion of plate material at the bottom of said hole.

37. The process defined in claim 36, wherein the rotabroached hole is cleaned with said chip collecting means after said hole is rotabroached to between about 0.1 and 0.01 inch from the bottom side of the plate.

38. A process for providing an alternate flow path for a coolant in a reactor of the type having a top former plate, and a core barrel with lateral ports which conduct a downflow of coolant between the core barrel and a set of core baffle plates, comprising the steps of plugging the lateral ports of the core barrel, boring almost completely through said top former plate while collecting any resulting chips formed as a result of the boring, cutting away the remaining material in the bore to form a hole which completely penetrates the top former plate, and then removing the resulting slug of cut material to prevent it from falling into the core barrel.

39. A tooling system for providing an alternate flow path for a coolant in a nuclear reactor having a core barrel with a perforated floor, and a top former plate overlying said barrel, comprising a portable tool support assembly positionable within the core barrel having a tool mounting means for sequentially and detachably mounting a series of tools for boring at least one hole through said top former plate, wherein at least one of said tools includes a means for collecting chips produced by the boring in order to prevent said chips from falling into the core barrel.

40. A tooling system for providing an alternate flow path for a coolant in a nuclear reactor having a core barrel with a perforated floor, and a top former plate overlying said barrel, comprising:

(a) a portable tool support assembly positionable within the core barrel having a tool mounting means for sequentially and detachably mounting a series of tools for boring at least one hole through said top former plate;

(b) a boring tool means for boring a hole substantially through the top former plate that includes a chip collection means for collecting the chips created by said boring tool to prevent the chips from falling into the core barrel, wherein said boring tool means is detachably mountable to the tool mounting means;

(c) a piercing tool assembly for completing the hole created by the boring tool with a minimum amount of chips, wherein said piercing tool is likewise detachably mountable to the tool mounting means;

(d) a clamp assembly for securing and positioning said tool mounting means of the portable tool support assembly over the top former plate, and (e) a base having at least one pin seatable in one of the perforations of the floor of the core barrel for securing and positioning the tool support assembly within the core barrel.

* * * * *